(12) United States Patent
Sterenson et al.

(10) Patent No.: US 7,822,060 B2
(45) Date of Patent: Oct. 26, 2010

(54) MAXIMAL RESOURCE UTILIZATION IN NETWORKS

(75) Inventors: Ron Sterenson, Ra'anana (IL); Zuri Guzikevits, Tel-Aviv (IL)

(73) Assignee: CopperGate Communications Ltd., Tel-Aviv (IL)

(*) Notice: Subject to any disclaimer, the term of this patent is extended or adjusted under 35 U.S.C. 154(b) by 1561 days.

(21) Appl. No.: 10/890,190

(22) Filed: Jul. 14, 2004

(65) Prior Publication Data

US 2006/0013129 A1 Jan. 19, 2006

(51) Int. Cl.
*H04L 12/413* (2006.01)
*H04J 3/02* (2006.01)

(52) U.S. Cl. .................... 370/445; 370/462

(58) Field of Classification Search .......... 370/230.1, 370/395.4–395.43, 486, 445–448, 450–457, 370/461–463
See application file for complete search history.

(56) References Cited

U.S. PATENT DOCUMENTS

| | | | | |
|---|---|---|---|---|
| 4,593,282 A | * | 6/1986 | Acampora et al. | 370/447 |
| 4,745,599 A | * | 5/1988 | Raychaudhuri | 370/348 |
| 5,619,695 A | * | 4/1997 | Arbabi et al. | 718/100 |
| 5,638,378 A | * | 6/1997 | Scop et al. | 370/445 |
| 5,771,234 A | * | 6/1998 | Wu et al. | 370/396 |
| 6,192,049 B1 | * | 2/2001 | Sohraby | 370/389 |
| 6,272,109 B1 | * | 8/2001 | Pei et al. | 370/230 |
| 6,574,206 B2 | * | 6/2003 | Young | 370/337 |
| 6,658,007 B1 | * | 12/2003 | Pasternak et al. | 370/395.4 |
| 6,665,732 B1 | * | 12/2003 | Garofalakis et al. | 709/247 |
| 6,714,546 B1 | * | 3/2004 | Watanabe et al. | 370/395.2 |
| 6,795,418 B2 | * | 9/2004 | Choi | 370/336 |
| 6,963,747 B1 | * | 11/2005 | Elliott | 455/450 |
| 7,046,639 B2 | * | 5/2006 | Garcia-Luna-Aceves et al. | 370/314 |

(Continued)

FOREIGN PATENT DOCUMENTS

EP 0622713 11/1994

(Continued)

OTHER PUBLICATIONS

Chang et al, "Guaranteed quality-of-service wireless access to ATM networks" Selected Areas in Communications, IEEE Journal, vol. 15, Issue 1, Jan. 1997, p. 106-118.*

(Continued)

*Primary Examiner*—Kevin C Harper
*Assistant Examiner*—Xavier Szewai Wong
(74) *Attorney, Agent, or Firm*—AlphaPatent Associates Ltd.; Daniel J. Swirsky (57) ABSTRACT

A network device includes a scheduler and a transmitter. The scheduler creates a media access plan (MAP) that has overlapping transmission opportunities and the transmitter transmits the MAP. Another network device includes a carrier sensor and a transmitter. The carrier sensor senses the availability of a network medium for transmission and the transmitter transmits data of a service during an allotted overlapping transmission opportunity if the carrier sensor indicates that the network medium is available. In another embodiment, the network device includes a unit which receives QoS parameters of at least one transmitted service from a QoS parameter determiner and a scheduler. The scheduler creates a MAP for a plurality of services to be transmitted, the scheduler defining the transmission opportunities based on their QoS parameters as received from either the parameter unit or applications providing the services.

9 Claims, 10 Drawing Sheets

U.S. PATENT DOCUMENTS

| | | | |
|---|---|---|---|
| 7,085,284 B1 * | 8/2006 | Negus | 370/461 |
| 2002/0019966 A1 | 2/2002 | Yagil et al. | |
| 2002/0093929 A1 * | 7/2002 | Mangold et al. | 370/336 |
| 2003/0063563 A1 * | 4/2003 | Kowalski | 370/230 |
| 2003/0067935 A1 * | 4/2003 | Hosein | 370/437 |
| 2004/0081162 A1 * | 4/2004 | Hodson | 370/395.4 |
| 2004/0109424 A1 * | 6/2004 | Chheda | 370/331 |
| 2005/0018601 A1 * | 1/2005 | Kalkunte et al. | 370/229 |
| 2005/0058151 A1 * | 3/2005 | Yeh | 370/445 |
| 2007/0153690 A1 * | 7/2007 | Stanwood et al. | 370/230 |
| 2008/0049761 A1 * | 2/2008 | Lin et al. | 370/395.21 |

FOREIGN PATENT DOCUMENTS

| | | | |
|---|---|---|---|
| WO | WO99/09689 | * | 2/1999 |
| WO | WO 00 56928 | | 9/2000 |

OTHER PUBLICATIONS

"Home Phoneline Networking Alliance Market Requirements Document", Home PNA 3.0 Specification Home Phoneline Networking Alliance, Inc., Oct. 16, 2001.

"Interface Specification for Home PNA 2.0.5.1 10M8 Technology", Confidential Home Phoneline Networking Alliance, Oct. 2001, version 2.0.5.1.

* cited by examiner

MAXIMAL RESOURCE UTILIZATION IN NETWORKS

FIELD OF THE INVENTION

The present invention relates to data networks generally and to home networks in particular.

BACKGROUND OF THE INVENTION

There are many different types of data networks, of which Ethernet is perhaps the best known. Some data networks have resource reservation schemes. One such network is HPNA (Home Phoneline Network Alliance) v.3, which is designed to work over existing telephone lines and COAX wiring to create a home/small office network. HPNA v.3 and other such resource reservation networks have a scheduler, described hereinbelow, to guarantee media resources to network devices, to prevent collision between multiple network devices using the same line and to ensure quality of service.

Figure 1:
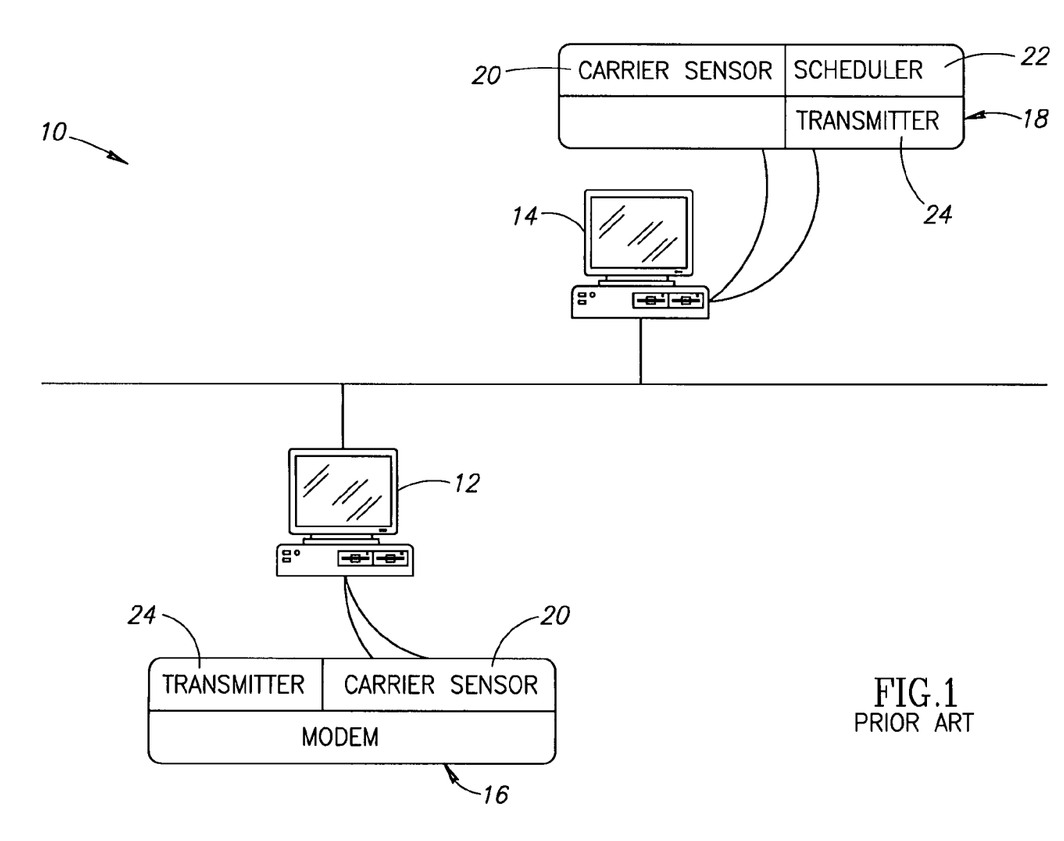
FIG. 1 is a schematic illustration of a prior art data network.
Figure 2:
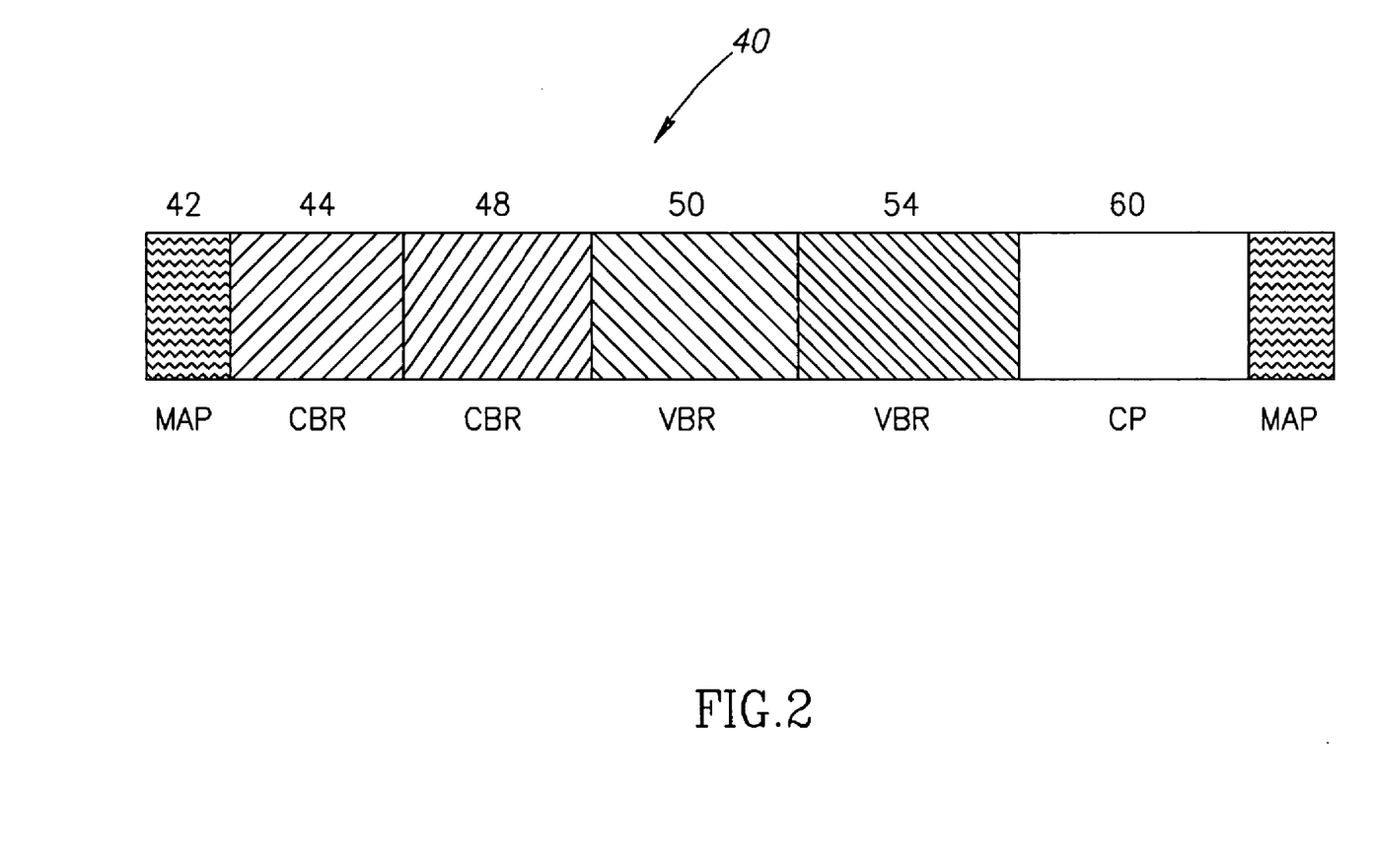
FIG. 2 is a schematic illustration of exemplary bandwidth allocation in prior art resource reservation schemes.

Reference is now made to FIG. 1, which depicts a prior art data network 10, comprising at least two network devices 12 and 14, connected to computers. Network device 12 comprises a modem 16 which may include, among other items, a carrier sensor 20 and a transmitter 24. Network device 14 comprises a modem 18 which may include, among other items, carrier sensor 20, a scheduler 22 and a transmitter 24, which transmits the data being transmitted. Scheduler 22 creates and sends to each device on the network a media access plan (MAP) at the beginning of each cycle. One such MAP, here labeled 40, is shown in FIG. 2, to which reference is now made. FIG. 2 depicts an exemplary prior art MAP. MAP 40 is a detailed schedule of future transmission opportunities (TXOPs) that will be made available to all network devices in the upcoming cycle described by MAP 40 and allocates each opportunity to a particular service. MAP 40 details the start time and length of each and all scheduled TXOPs 44, 48, 50, 54 in the next cycle of transmissions, and assigns each TXOP to a particular network device. For example, TXOP 44 may be the first TXOP and may be assigned to a digital telephony service. TXOP 50 may be the third and it may be assigned to a video stream.

Within data networks, there are generally three types of services, constant bit-rate (CBR) services, variable bit-rate (VBR) services and best effort (BE) services. For CBR services, there is a constant amount of data being transferred at any given time. Exemplary CBR services are digital telephony transmissions. For VBR services, such as a video stream, the amount of data to be transferred varies from transmission to transmission.

The scheduler can easily schedule CBR activity, since the same amount of bandwidth is required for each transmission. VBR is more complicated to schedule, due to its varied nature, and generally the scheduler allocates a fixed amount of bandwidth to be utilized. The amount allocated is typically between peak and average bit-rate requirements for the service. Because VBR flows transmit a variable amount of bits per cycle, the allocated bandwidth may not necessarily be utilized during each cycle.

Best effort services are transmitted during contention periods (CPs), described hereinbelow, during which the services to be transmitted contend for access to the network. Thus, only those that access the network get transmitted and their level of service is not guaranteed. The data is typically transmitted with a variable number of bits per cycle.

Typically a MAP schedules CBR and VBR flows first, followed by a contention period, during which all devices may transmit BE data on a first-come, first-served basis. In the cycle described by MAP 40, the first CBR TXOP 44 is scheduled to begin after MAP TXOP 42, and a second CBR TXOP 48, may begin as soon as the end time of CBR TXOP 44 occurs. The start time of a first VBR TXOP 50 is scheduled for immediately after the end of CBR TXOP 48. At the end time of VBR TXOP 50 the scheduled start time of a second VBR TXOP 54 may begin. Finally, at the end of the cycle, a CP 60 is scheduled.

After MAP 40 has been sent to all network devices, each device recognizes a particular TXOP that has been assigned to it according to MAP 40, and either utilizes the TXOP or passes on it. Carrier sensor 20 (FIG. 1) within each device may sense if the network medium is available. If it is free to use, the device begins to transmit data.

Figure 3:
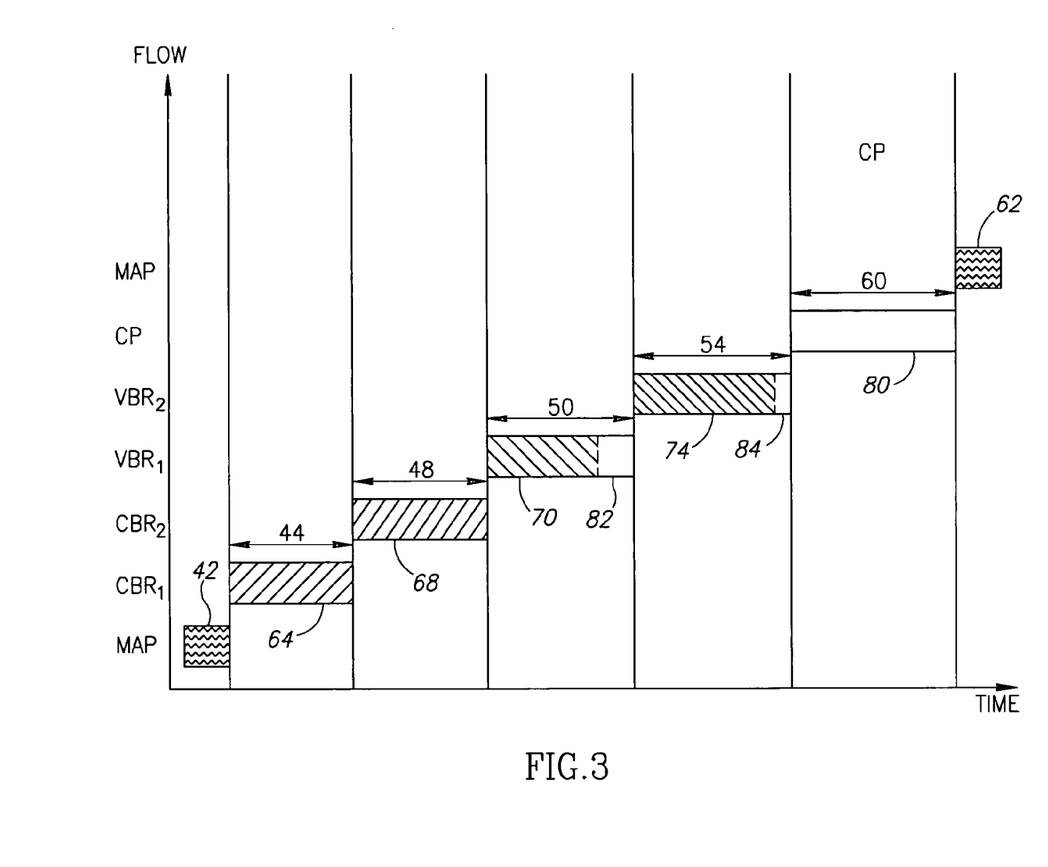
FIG. 3 is a timing diagram illustration of exemplary transmissions for the bandwidth allocation of FIG. 2.

Reference is now made to FIG. 3, which illustrates an exemplary transmission using MAP 40. First, MAP 40 is sent out by scheduler 22 (FIG. 1). After MAP 40 is received, the transmissions may begin. First, $CBR_1$ 64 and $CBR_2$ 68 are transmitted during TXOPs 44 and 48, respectively. Immediately after $CBR_2$ 68, the first VBR transmissions may start.

The first VBR transmission, $VBR_1$ 70 takes place during VBR TXOP 50, but the service does not utilize all the bandwidth allocated. Thus, there is some unused bandwidth 82. After VBR TXOP 50 completes, the next VBR transmission 74 begins during VBR TXOP 54. As with the previous transmission opportunity, $VBR_2$ 74 did not utilize all the bandwidth allocated and thus, some of the bandwidth, labeled 84, is wasted.

During contention period (CP) 60, the available bandwidth is made free for BE data transmissions 80, and especially for BE transmissions for which quality of service (QoS) is not guaranteed, and which were not scheduled to be transmitted during the scheduled TXOPs.

As can be seen, the prior art MAP wastes significant resources when the VBR has less to transmit than its allocated bandwidth. Wasting resources also means that any traffic for which QoS parameters are not guaranteed has little opportunity to be transmitted and its packets must be stored until it can be transmitted.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

The present invention may take assigned-but-unused portions of transmission opportunities (TXOP) and may dynamically assign them to another network node. To do so, the present invention may utilize a prioritization method to determine which network node, which may detect that transmission has ended, may occupy the unused gap first. In one embodiment, the present invention may pre-assign partially overlapping TXOPs. In another embodiment, the next TXOP may be 'moved' to start sooner.

Figure 4:
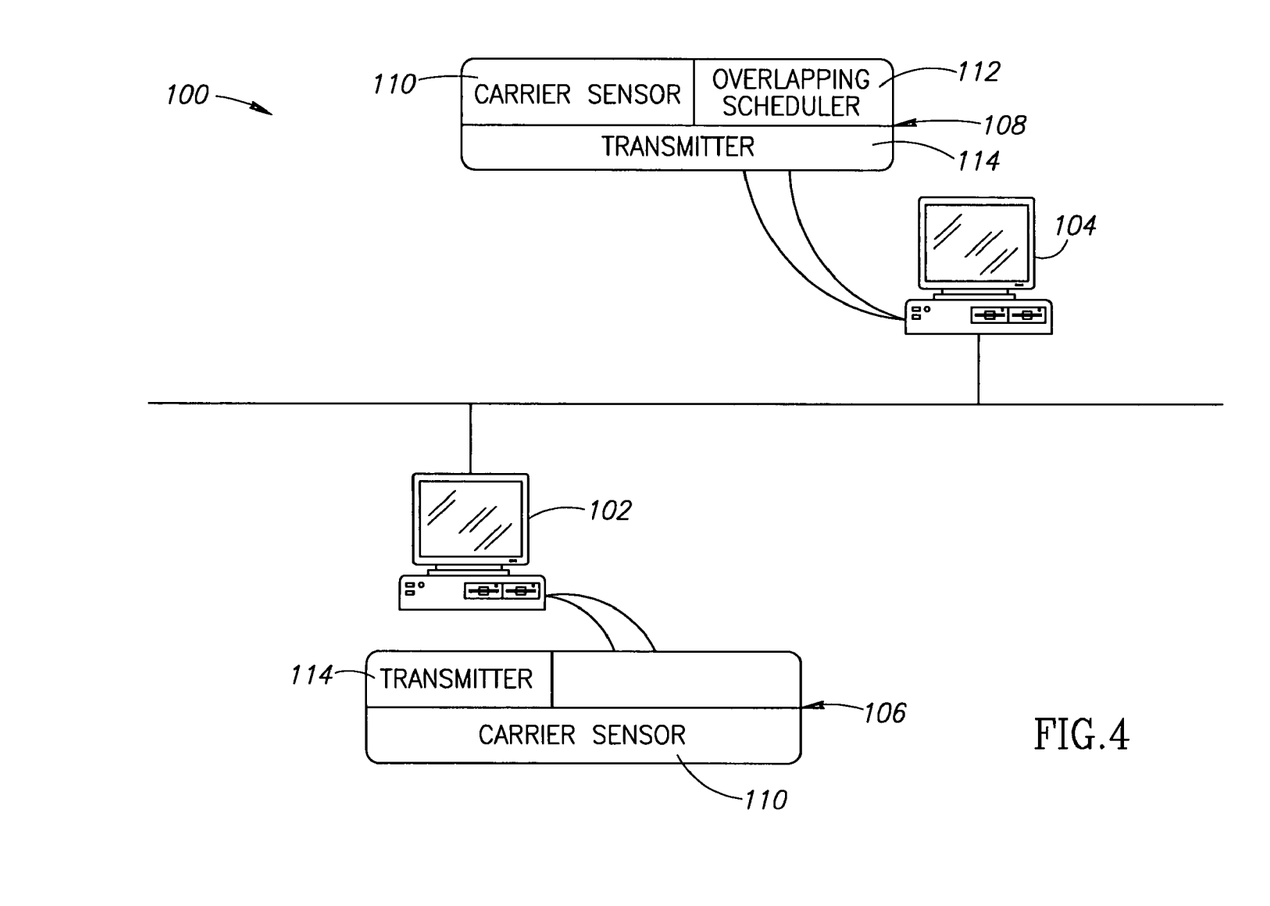
FIG. 4 is a schematic illustration of a data network, constructed and operative in accordance with a preferred embodiment of the present invention.
Figure 5:
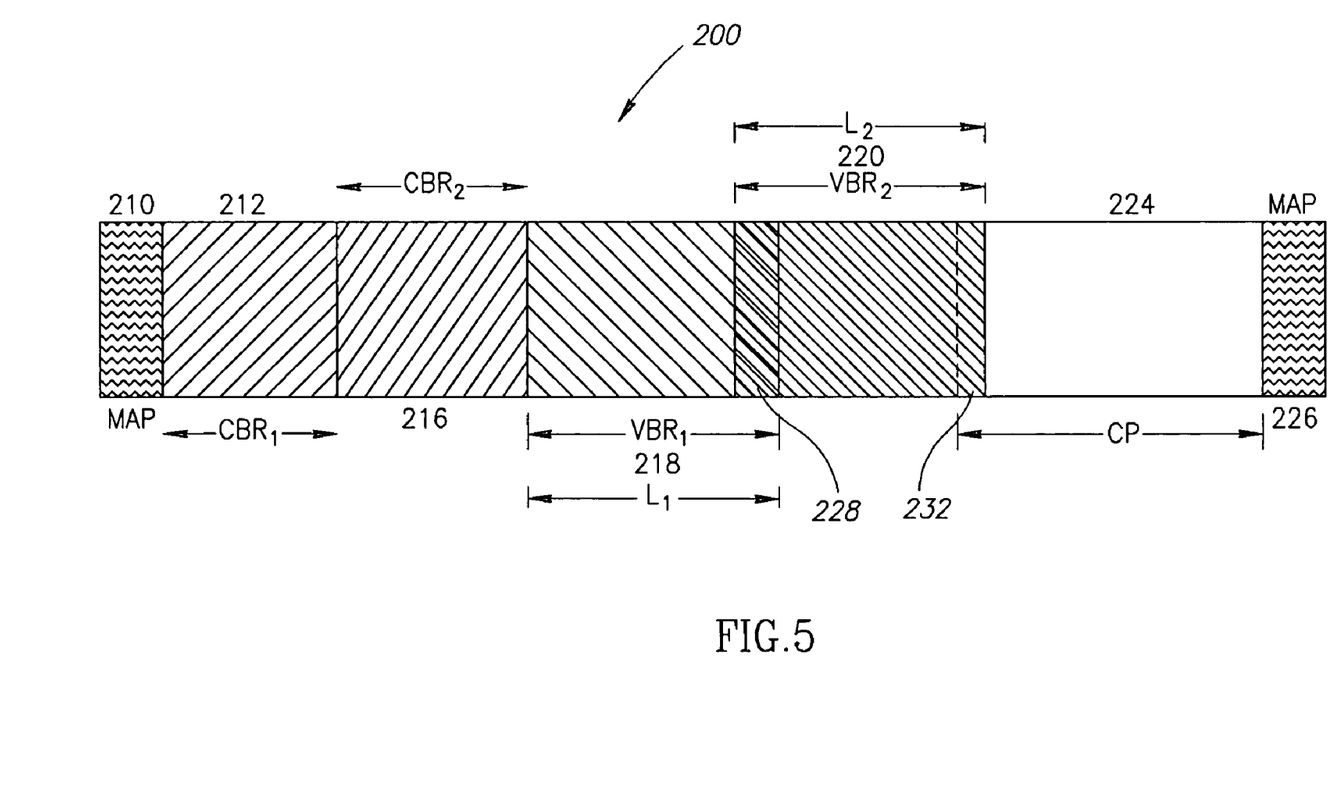
FIG. 5 is a schematic illustration of bandwidth allocation, constructed and operative in accordance with a preferred embodiment of the present invention.

Reference is now made to FIG. 4, which depicts a maximal resource utilization data network 100, and to FIG. 5, which illustrates an exemplary overlapping media access plan (OMAP) 200, constructed in accordance with the present invention and produced for network 100. Data network 100 comprises at least two network devices 102 and 104. Network device 102 comprises a modem 106 which may include, among other items, a carrier sensor 110, which may be similar to prior art carrier sensors, and a transmitter 114, which may be similar to prior art transmitters. Network device 104 comprises a modem 108 which may include, among other items, carrier sensor 110, an overlapping scheduler 112 and a transmitter 114. Overlapping scheduler 112 creates an OMAP, such as OMAP 200 shown in FIG. 5, at the beginning of each cycle, and sends it to each device on the network. Like prior art MAP 40 (FIG. 2), OMAP 200 describes the schedule of transmission opportunities (TXOP) and bandwidth allocation particular to each device on the network. However, unlike prior art MAP 40 (FIG. 2), OMAP 200 allows VBR transmission opportunities to overlap.

To produce OMAP 200, scheduler 112 (FIG. 4) generally first schedules the start times of CBR TXOPs, such as TXOPs 212 and 216, in accordance with the prior art. It will be appreciated that there may be no CBR TXOPs, or that they may be scheduled after VBR TXOPs. However, it is noted that CBR TXOPs generally have constraints on the amount of "jiggle" that their start times may have and thus, since VBR TXOPs are allowed to overlap, scheduler 112 may usually choose to schedule the CBR TXOPs first in each OMAP 200.

The start time of a first VBR TXOP 218, during which transmission VBR data will be transmitted, is generally scheduled to begin after the end of CBR TXOP 216 and is allowed to last a length $L_1$. In accordance with the present invention, the scheduled start time of a second VBR TXOP, here labeled 220, is scheduled to begin before the first VBR TXOP 218 has finished, and is allowed to last a length $L_2$. There is an overlap period 228 when both VBR TXOPs 218 and 220 are scheduled. Only one VBR flow may transmit at any given time. Thus, the VBR flow allocated to 220 may begin only once the VBR flow of 218 has finished. Overlap period 228 provides flexibility in starting the next transmission and thus can handle the variability of VBR transmissions.

Figure 6:
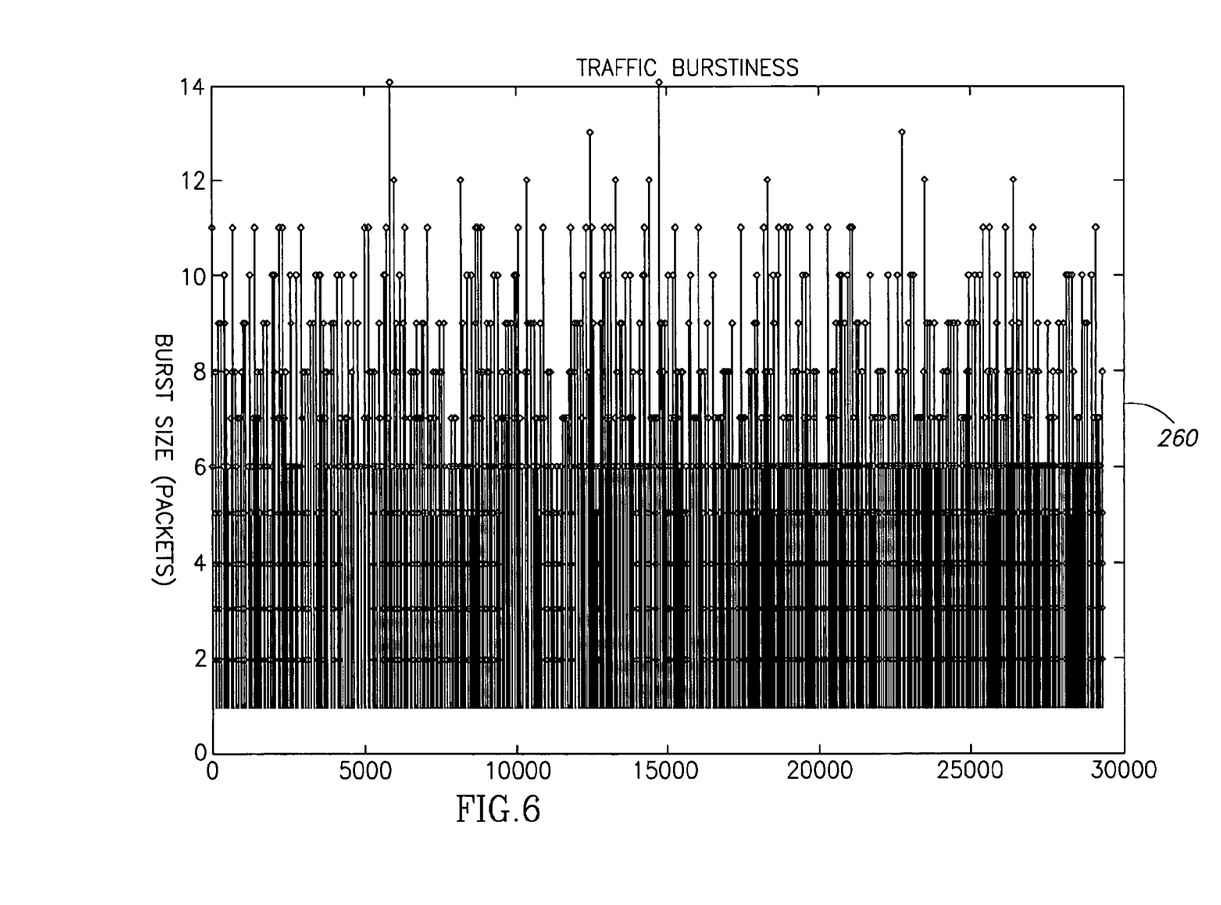
FIG. 6 is a graphical illustration of traffic burstiness in VBR flow.

The length of each TXOP is a function of the expected burst size of services allocated to the TXOP. Reference is now made to FIG. 6, which is a graph of burst size over time and provides a schematic illustration of the burst level of various VBR transmissions. As can be seen, the transmissions vary significantly over time. The average burst size 260 is used to determine the amount of bandwidth allocatable to each TXOP. To divide the bandwidth among the various VBR services, overlapping scheduler 112 (FIG. 4) first allocates resources according to the average bit-rate requirements. Once all average bit-rate requirements have been met, the remaining bandwidth is divided up among the VBR TXOPs up to their peak bit-rate requirements. Furthermore, overlapping scheduler 112 may schedule overlapping TXOPs beyond the additional bandwidth allocated to the TXOP, or even the maximum amount of bandwidth allowed, provided flow jitter requirements are met. Thus, most services will be allocated enough bandwidth to complete most data transmissions.

Figure 7:
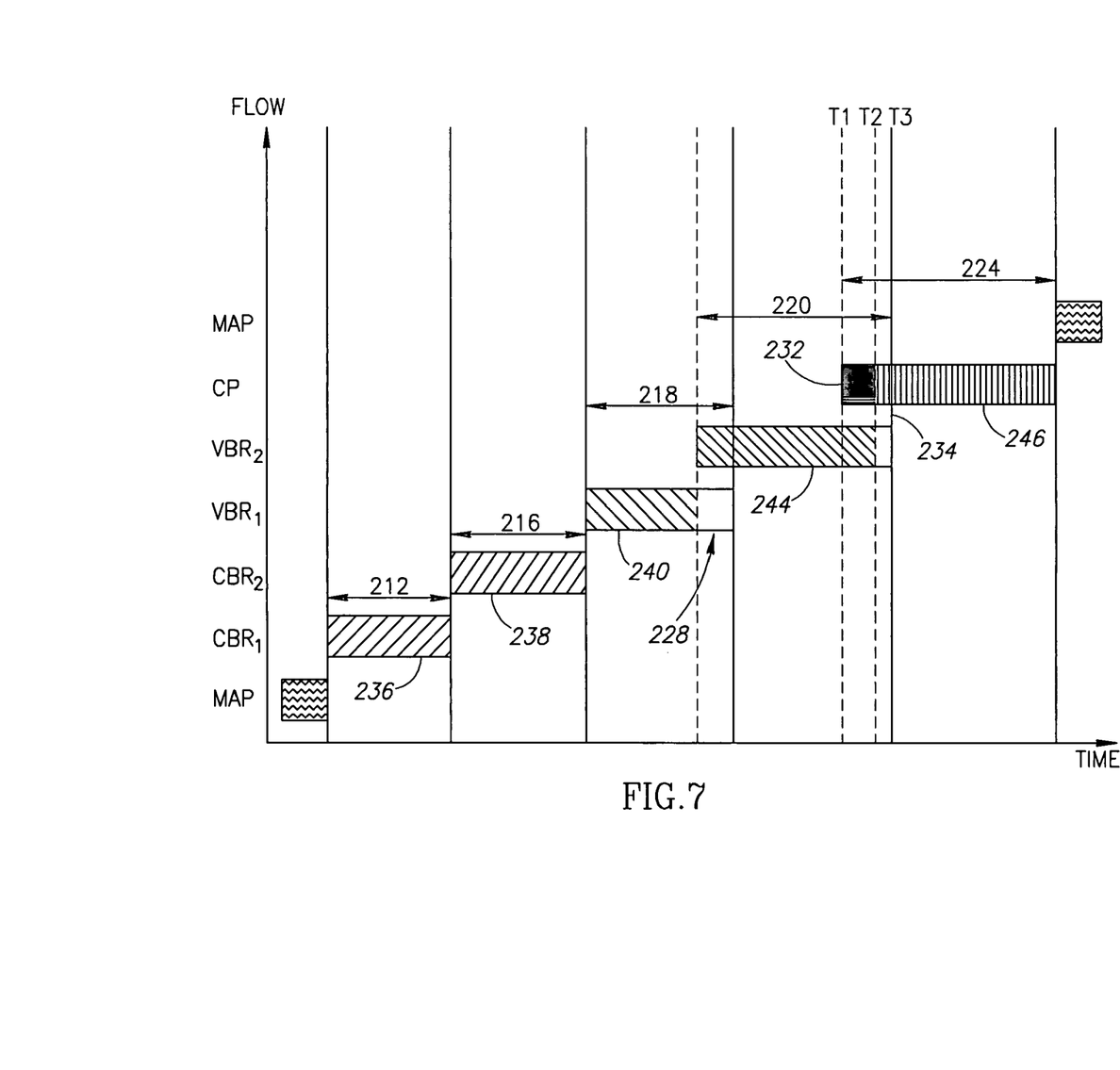
FIG. 7 is a timing diagram illustration of exemplary transmissions using the exemplary allocation of FIG. 5.

Reference is now made to FIG. 7, which illustrates an exemplary cycle of transmissions using exemplary OMAP 200. After OMAP 200 is received by network devices, the cycle begins. The first transmissions, CBR1 236 and CBR2 238, are transmitted during TXOPs 212 and 216, respectively. VBR1, the service utilizing VBR TXOP 218, begins its transmission 240 at its scheduled start time, according to OMAP 200. The amount of bandwidth needed to complete transmission 240 is far less than the amount allotted to VBR TXOP 218. However, overlapping scheduler 112 (FIG. 4), in accordance with the present invention, has scheduled the next TXOP, VBR TXOP 222, to overlap an end portion of VBR TXOP 218 and to begin after all the data has been transmitted in VBR1 240. Thus, there is an overlap period 228 when VBR2 244 can begin transmission, so long as the previous service, VBR1, has finished transmitting data. Carrier sensor 110 (FIG. 4) in the network device waiting to utilize VBR TXOP 222 senses when VBR1 finishes, at which point it allows VBR2 to begin its transmission 244.

After transmission 244 of $VBR_2$ has finished, all scheduled TXOPs have finished. It is now time for CP 224 to begin, during which all BE services, for whom quality of service (QoS) is not guaranteed, may transmit. In accordance with the present invention, the start time of CP 224 overlaps VBR TXOP 220, such that BE transmission may begin whenever transmission 244 of $VBR_2$ ends, so long as the transmission ends during the overlap period 234.

As can be seen in FIG. 7, CP 224 was scheduled to start at time T1. However, transmission 244 of $VBR_2$ had not finished transmitting at time T1. Thus, there is a period 232 during which any device desiring to utilize CP 224 may have wanted to begin transmissions, but was blocked because $VBR_2$ was still utilizing the line for transmission 244. Nonetheless, BE transmission 246 begins at time T2, before the scheduled end, at time T3, of VBR TXOP 220.

As can generally be seen, BE transmission 246 is longer than prior art BE transmission 80 (FIG. 3). In accordance with the present invention, all VBR services were transmitted one after another with no wasted bandwidth between each data transmission. The available resources (bandwidth) for the cycle were maximally, or close to maximally, used; thus, the amount of bandwidth available for BE transmissions 246 during CP 224 is significantly larger than in prior art schemes. As a result, a larger amount of data of any flow type may be transmitted during the cycles of the present invention, largely because resources are utilized optimally. Because of this, the amount of memory required to store non-transmitted packets may also be reduced.

Figure 8:
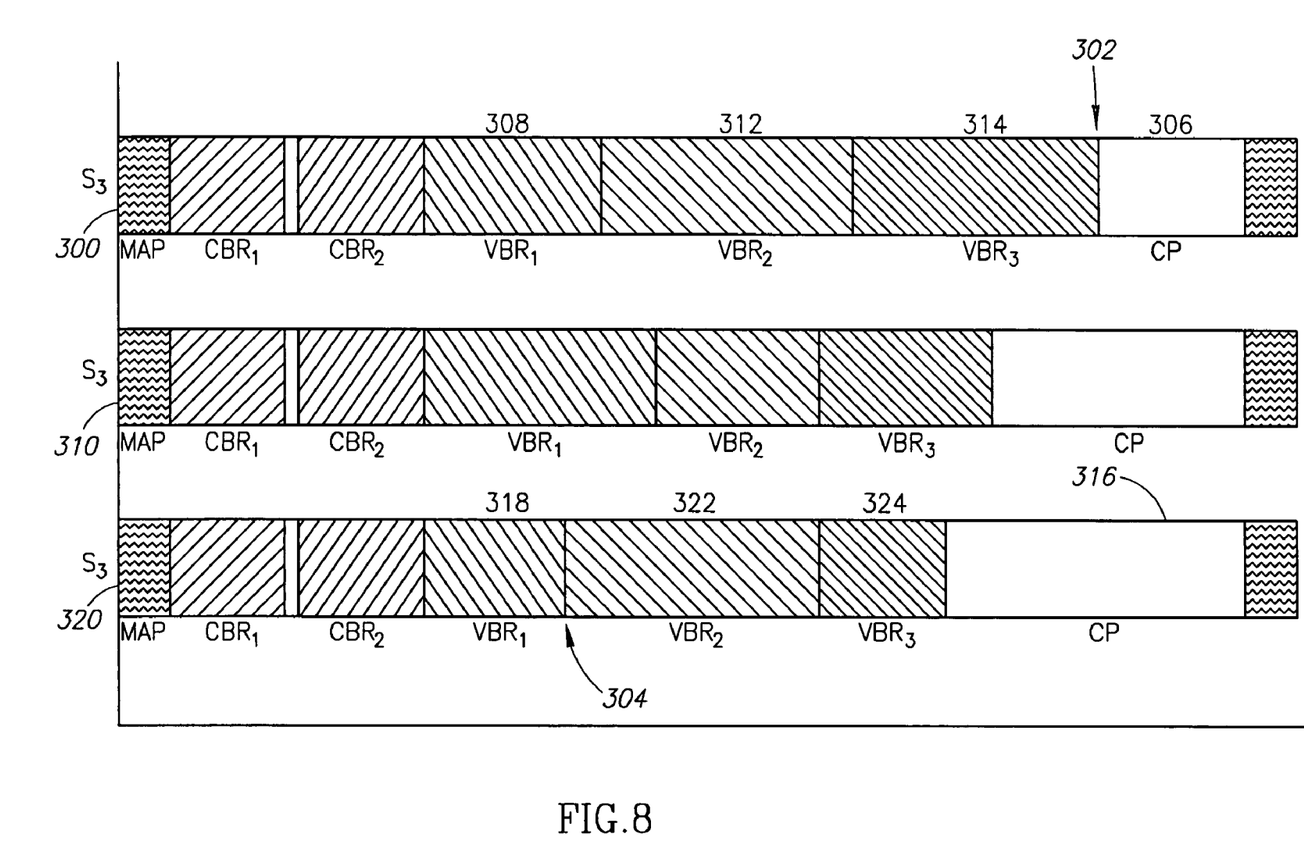
FIG. 8 is a schematic illustration of multiple instantiations of one MAP, in accordance with a preferred embodiment of the present invention.

Reference is now made to FIG. 8, which is a timing diagram of several different transmission cycles which may occur with an OMAP specifying two CBR TXOPs separated by a short CP, followed by three overlapping VBR TXOPs, and finally a long CP. The amount of bandwidth allocated to each particular cycle is fixed according to the OMAP, but the utilization of the bandwidth amongst the different TXOPs is largely dependant on the amount of data the service utilizing each TXOP requires. In all of the cycles, in accordance with the present invention, the CBR transmissions utilize a constant amount of bandwidth. Likewise all cycles transmit two CBR transmissions, followed by three subsequent VBR transmissions, and finally a CP. All three cycles described in FIG. 8 are bound by the OMAP; therefore, there is for example, a maximum end time 302 for $VBR_3$ to transmit, as well as a maximum start time 304 for $VBR_2$ 322 to begin transmitting. In the scenario labeled 300, $VBR_1$ 308 used a relatively average amount of bandwidth, whilst $VBR_2$ 312 and $VBR_3$ 314 used relatively larger amounts. The amount of bandwidth left for the CP 306 is fairly small, as the VBR transmissions 308, 312, 314 used most of the bandwidth. In the scenario labeled 320, however, the resultant CP 316 is fairly large, as the VBR transmissions 318, 322, 324 in that cycle did not use much bandwidth. As can be seen from FIG. 8, the contention period in the present invention is not of a fixed length. Rather, the bandwidth available for contention varies from cycle to cycle, even though the OMAP may not change.

A situation may arise whereby several transmissions occupy their complete scheduled TXOP, and the start time of several scheduled TXOPs may occur simultaneously. In such a case, as soon as the line becomes idle, and carrier sensor 110 (FIG. 4) allows, several transmissions may attempt to start transmission at the same time and will collide. Once collisions occur, the allocated bandwidth may be wasted and the advantages of resource reservation may be lost. In order to ensure that collisions do not occur, at least two solutions are possible.

In one embodiment, all TXOPs are scheduled according to their earliest possible start time. In addition, each transmission is assigned a backoff-level (BL) which describes an order of transmission. For example, the second TXOP in a given OMAP may be assigned a BL value of 2. In order to start transmitting, not only must the carrier-sensor and TXOP start time conditions be met, a BL counter, which counts backoff levels, must have a value of zero as well. All devices will count transmissions and decrement the BL counter at the end of each transmission. If a device does not transmit during its TXOP, the BL counter is decremented after a transmission or after the passage of a short amount of time. The BL counter will recognize the passage of a TXOP by a standard method, described hereinbelow. A certain device expects a transmission assigned to a TXOP to start within a short amount of the TXOP start time. If this amount of time passes, and the carrier sensor does not detect a transmission, the TXOP may be considered unused. The amount of time may be defined as the amount of non-overlapping time in a TXOP or any pre-selected amount of "silent" time at the beginning of the TXOP.

It will be appreciated that utilizing a backoff level is one method of prioritizing the transmission opportunities. Other methods might include counting the transmissions and enabling transmission only once the network medium is free of transmissions and the transmission count and the transmission number provided to the service match.

In an alternative method, transmissions may be scheduled according to their latest possible start time. The start time may then be modified according to what actually occurs during the cycle of transmissions. Utilizing this method, devices may monitor and count transmissions on the line, but transmission start time may be adjusted to a value that is earlier than the worst case, if the carrier sensor allows. When a particular device's TXOP arrives, it may adjust the start time of the transmission to be the current start time or the TXOP start time, whichever is later. Network devices should guarantee that the transmissions start between the best and worst case start-times.

Figure 9:
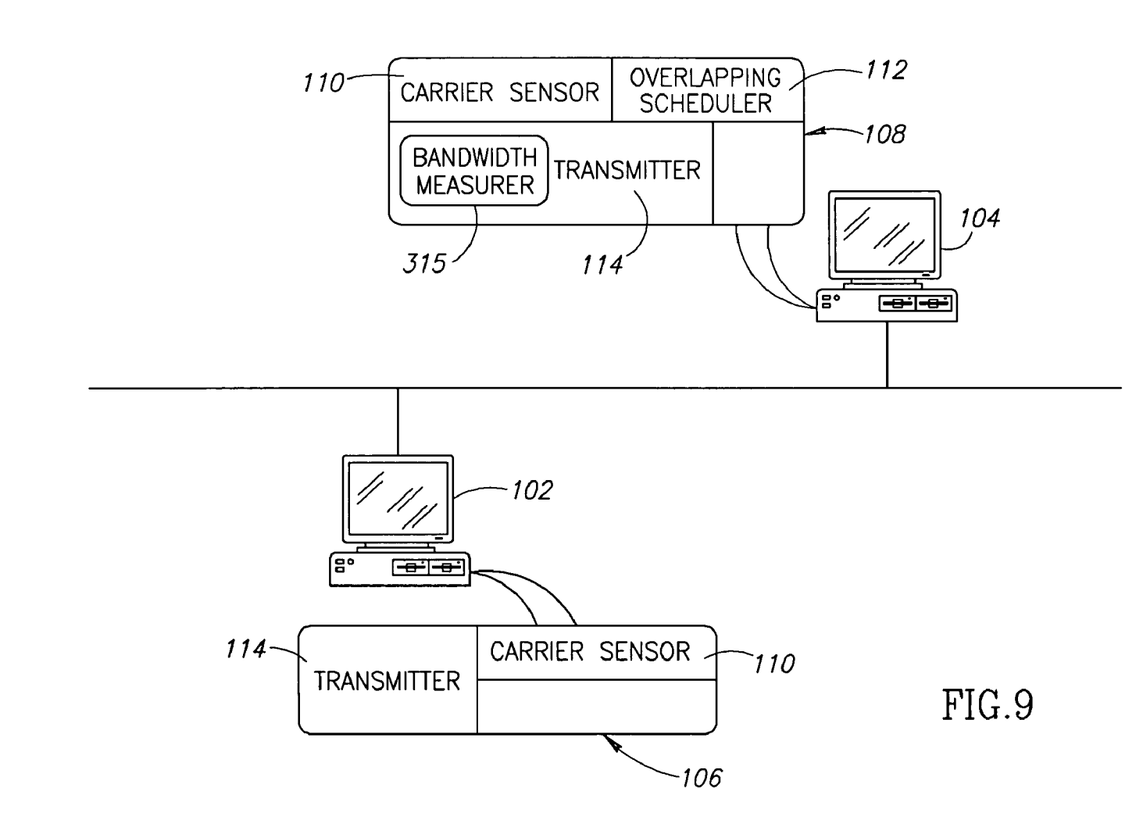
FIG. 9 is a schematic illustration of a data network, constructed and operative in accordance with an alternative embodiment of the present invention.

In the previous embodiment, overlapping scheduler 112 (FIG. 4) received the QoS parameters from the application providing the service. However, not all applications (especially older ones) are capable of providing QoS parameters to external devices, such as overlapping scheduler 112 (FIG. 4). Reference is now made to FIG. 9, which depicts a data network, constructed and operative in accordance with an alternative embodiment of the present invention, having a QoS bandwidth measurer 315 on one of network devices 104 or 106. FIG. 9 shows bandwidth measurer 315 on network device 104; however, it may be found on any of the network devices. FIG. 9 may be similar to FIG. 4, and thus similar reference numerals refer to similar elements.

For services where QoS parameters are not available to overlapping scheduler 112, in order to best schedule transmissions, data is transmitted during a CP as a BE service. However, in another embodiment of the present invention, it is also possible for QoS parameters to be made available to overlapping scheduler 112 by using bandwidth measurer 315.

Figure 10:
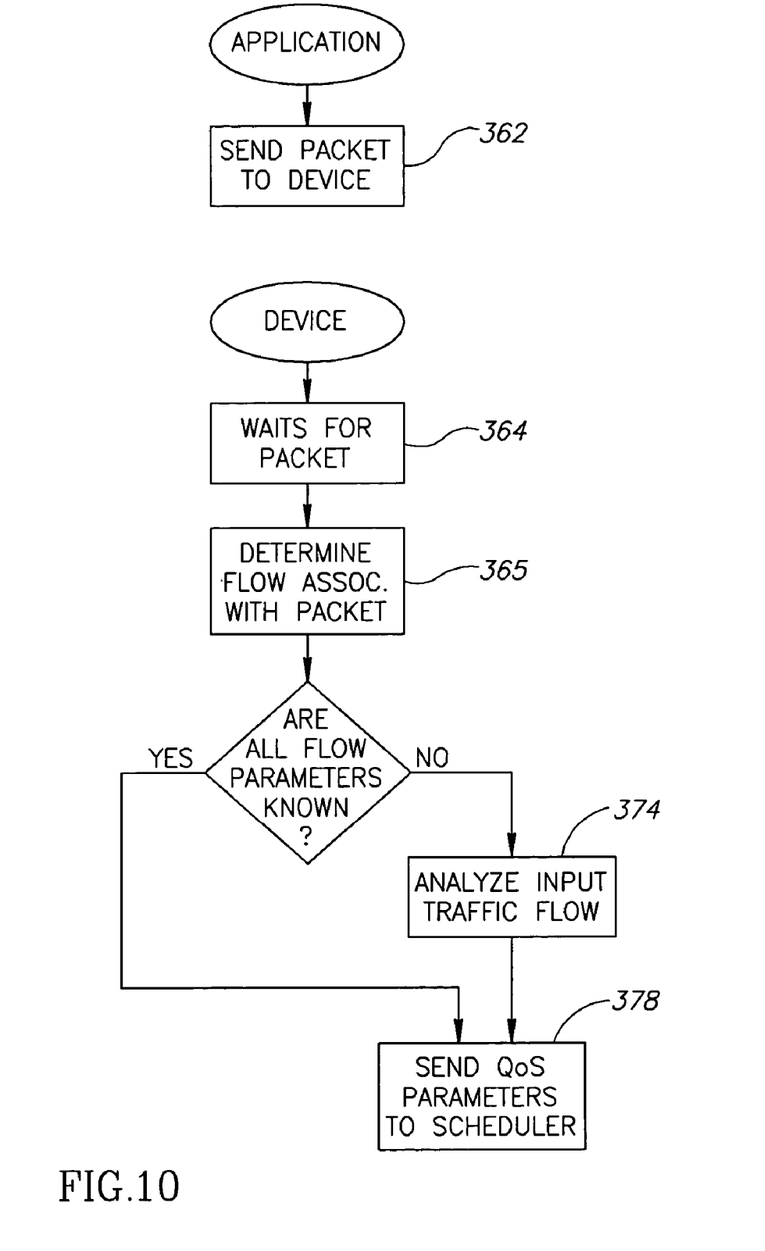
FIG. 10 is a flow chart illustration of a QoS parameter adaptation method, constructive and operative in accordance with an alternative embodiment of the present invention.

Reference is now made to FIG. 10, which depicts a flow chart of the operation of the data network of FIG. 9, operative in accordance with an alternative embodiment of the present invention. On the application side, an application providing a service sends (step 362) packets containing data messages to a device. On the device side, the device waits (step 364) for the packets. Then, device may determine (step 365) the arrival rate of the packets based on a known method, such as buffer fill rate. Additional QoS parameters may be determined from analyzing the content of the arriving packets. Bandwidth measurer 315 (FIG. 9) may then analyze (step 374) the packet arrival rate, which may correspond to the data bandwidth. Bandwidth measurer 315 (FIG. 9) may then notify (step 378) overlapping scheduler 112 (FIG. 9) about the required bandwidth QoS parameters and any other parameter, if determined. Overlapping scheduler 112 may then assign a TXOP to that service based on the previously described mechanism. It will be appreciated that the bandwidth measurement process may be performed continuously, thereby enabling overlapping scheduler 112 (FIG. 9) to dynamically adjust the assigned TXOP from cycle to cycle and to use the network bandwidth resources more efficiently.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method implementable on an electronic network scheduling device for scheduling multiple transmission opportunities in a frame for a carrier sensing data network, the method comprising:
   establishing at least one of said transmission opportunities for a variable bit-rate (VBR) service;
   establishing at least one of said transmission opportunities for a constant bit-rate (CBR) service;
   prior to a start of transmissions, setting explicit schedules of at least two of said transmission opportunities to at least partially overlap, the first of which is for a VBR service and the second of which is for one of the following services: a VBR service and a constant bit-rate CBR service; and
   providing said schedules to network nodes prior to said start of transmissions to enable continuous communications.

2. The method according to claim 1 and wherein said scheduling comprises scheduling CBR services before VBR services.

3. The method according to claim 1 and also comprising scheduling an overlap period between a transmission opportunity and a previous transmission opportunity for transmission of a second service back to back with the service utilizing said previous transmission opportunity.

4. The method according to claim 1 and comprising providing a best transmission start time for said second transmission opportunity for starting a transmission once said network is free of transmissions.

5. The method according to claim 1 and wherein said scheduling comprises providing at least two transmission opportunities with a prioritization level and a transmission start time.

6. The method according to claim 5 and wherein said transmission start time is for use once said network is free of transmissions and said prioritization level has been achieved.

7. The method according to claim 1 and wherein said scheduling comprises providing a best start time and a length for each transmission opportunity.

8. The method according to claim 3 and wherein said overlap period includes a best start time and a derivable worst start time if said network is free of transmissions.

9. The method according to claim 1 and also comprising transmitting two or more of said VBR transmissions back-to-back when one or more of said VBR transmissions does not utilize all of its allotted transmission opportunity.

* * * * *